United States Patent [19]
Seymour

[11] 3,741,743
[45] June 26, 1973

[54] GLASS SHEET SHAPING FRAME

[76] Inventor: Samuel L. Seymour, 26 Crystal Drive, Oakmont, Pa. 15139

[22] Filed: July 31, 1972

[21] Appl. No.: 276,877

Related U.S. Application Data

[63] Continuation-in-part of Ser. No. 83,935, Oct. 26, 1970, abandoned.

[52] U.S. Cl. .......................... 65/287, 65/288, 65/374
[51] Int. Cl. ............................................. C03b 23/02
[58] Field of Search .................. 65/287, 288, 289, 65/290, 291, 104, 374

[56] References Cited
UNITED STATES PATENTS

| | | | |
|---|---|---|---|
| 2,297,315 | 9/1942 | Owen | 65/287 |
| 2,720,729 | 10/1955 | Rugg | 65/288 |
| 2,729,032 | 1/1956 | White | 65/289 |
| 3,298,809 | 1/1967 | Barch et al. | 65/287 |
| 3,586,492 | 6/1971 | McMaster | 65/287 |
| 3,310,273 | 3/1967 | Seymour | 65/287 X |

Primary Examiner—Arthur D. Kellogg
Attorney—Russel A. Eberly

[57] ABSTRACT

A shaping frame for engaging the peripheral portion of a glass sheet during shaping and tempering comprising a rigid reinforcing member aligned in offset relation to the margin of the glass sheet treated and screen means to space said glass sheet from said rigid reinforcing member, said screen means preferably comprising a heavy wire mesh supported on the rigid reinforcing member and a fine wire mesh that contacts the glass supported in spaced relation to said rigid reinforcing member by the heavy wire mesh.

12 Claims, 6 Drawing Figures

Patented June 26, 1973 3,741,743
2 Sheets-Sheet 1
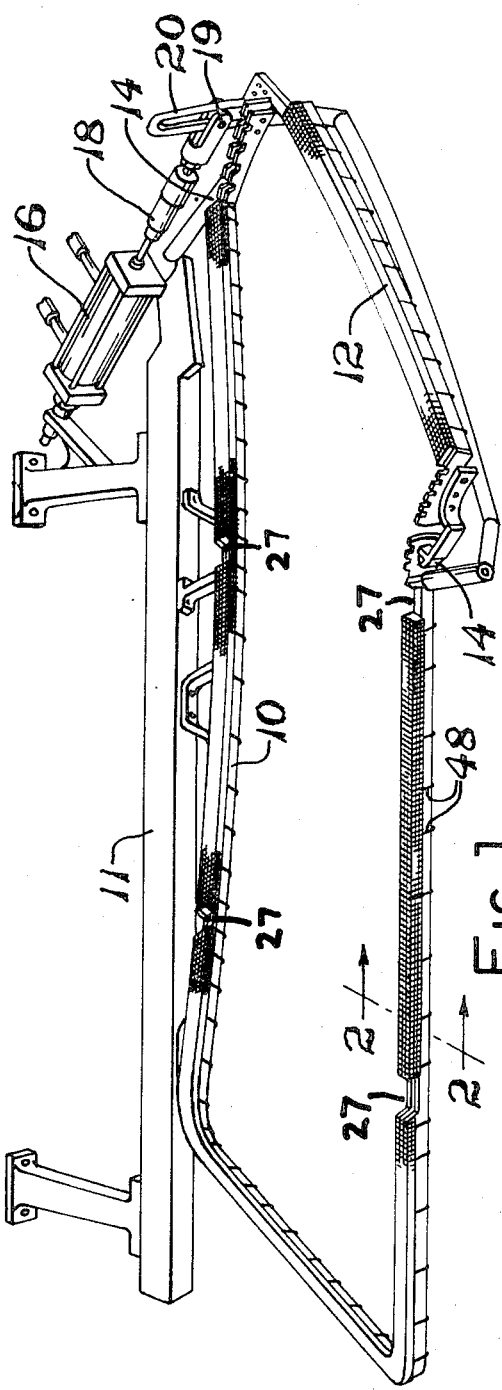
FIG. 1
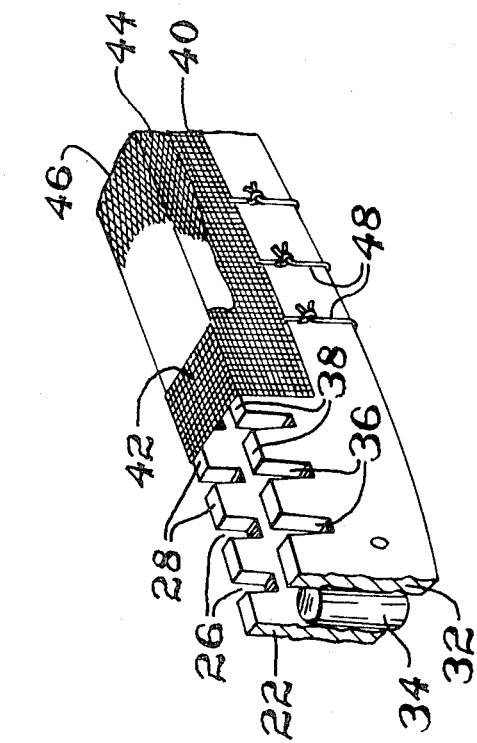
FIG. 3
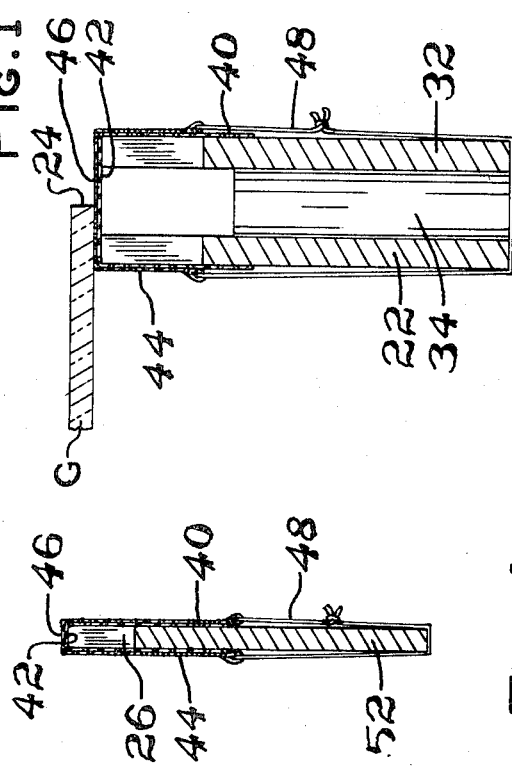
FIG. 2
FIG. 4

GLASS SHEET SHAPING FRAME

CROSS-REFERENCE TO RELATED APPLICATIONS

This application is a continuation-in-part of U.S. Pat. application Ser. No. 83,935 of Samuel L. Seymour, filed Oct. 26, 1970, for BENDING GLASS SHEETS, now abandoned.

BACKGROUND OF THE INVENTION

The present invention relates to bending and tempering glass sheets. When glass sheets are bent and tempered, they are heated to a temperature above the deformation temperature of the glass, usually on the order of 1,200° Fahrenheit to 1,250° Fahrenheit, and then rapidly quenched after they either sag by gravity or are pressed between complementary shaping molds to a desired shape.

Usually, glass sheets are engaged by the edge surface of one or more shaping frames comprising shaping rails that conform to the outline and contour desired slightly inward of the periphery of the glass sheet. The glass conforms to the shape of the shaping rails while heat softened and then, immediately after shaping, the rapid quenching cools the glass sheet periphery relatively rapidly while the rate of cooling of the line in contact with the outline shaping rails is retarded. Thus, when the entire glass sheet ultimately cools to below the strain point of the glass, the periphery is stressed in compression while the line of glass whose cooling rate was thus retarded is stressed in tension. While it is known to serrate the shaped edge surface of a shaping rail and/or to perforate the shaping rail to reduce the thermal effect of the mold rail on the glass sheet, the prior art has still failed to avoid producing a maximum residual tension stress in the portion of the bent glass sheet that engages a rail during the quenching step that causes the bent glass sheet to fracture sufficiently frequently during tempering to be a production problem.

When glass is tempered, it develops a skin that includes its marginal edge stressed in compression surrounding an interior stressed in tension. Since glass is notoriously strong in compression and weak in tension, it is important to limit the location of the tension stress developed to the interior of the tempered glass to avoid the possibility of spontaneous breakage.

DESCRIPTION OF THE PRIOR ART

U.S. Pat. No. 2,261,023 to Galey shows a gravity sag mold of the outline type with a serrated edge shaping surface for supporting a glass sheet during sag bending and tempering. The glass sheet makes direct contact with the mold surface during its processing. While serrating the edge shaping surface reduced the heat exchange between the glass and the mold to some extent, the metal mold still affects the rate at which the glass temperature is lowered in the mold contacting region of the glass during the rapid quenching.

U.S. Pat. No. 2,408,526 to Minton shows a gravity sag mold with a strand of non-combustible material, such as asbestos, which spaces the glass from direct contact with the mold. This spacing reduces the effect of the mold mass on the rate of temperature change in the glass portion engaging the mold rail during the thermal processing incidental to tempering. Unfortunately, this spacing material is worn by abrasion and must be replaced frequently.

U.S. Pat. No. 2,897,632 to Fowler et al. confirms the need for stressing glass sheet edges in compression and teaches that glass sheets bent and cooled on outline molds develop tension stress not only in portions engaging the mold but in other portions not engaging but sufficiently close to heavy metal to be in heat-exchanging relation thereto during a bending and cooling operation. The area between two spaced lines of tension stress develops a compression stress sufficient for the edge of a glass sheet. This patent suggests cutting the bent glass along the line of compression stress established between two spaced lines of tension stress to form a strong edge.

U.S. Pat. No. 3,256,080 to Vranken press bends hot glass sheets by engaging the opposite major surfaces inward of the margins with shaping frames that continue to engage the shaped glass during quenching. The periphery of the glass cools relatively rapidly to impart a compressive edge stress, but the glass portion engaged by the frames develops tension stresses of a magnitude sufficient to cause spontaneous breakage.

U.S. Pat. No. 3,310,273 to Seymour shows apparatus supporting the bottom edge of glass sheets with a wire mesh supported on a rigid member. The wire mesh does not impose a banding force on a major surface of the glass sheet.

U.S. Pat. No. 3,586,492 to McMaster shows a discontinuous shaping frame conforming to the outline of a glass sheet to be bent and comprising a series of pointed teeth spaced about the periphery of the frame. Each tooth has its upper edge forming a linear sheet contacting area that extends normal to the tangent of the outline of the shaping frame. A stainless steel wire mesh screen is held in position on the frame and extends downward in the space between teeth so that only the portions of the wires of the mesh screen over the teeth contact the glass sheet. Since the teeth extend from inside to outside the marginal edge of a supported glass sheet, the mass of each tooth tends to develop a line of tension stress extending inward from the edge of glass sheets supported on the frame during shaping and tempering. The glass sheets produced on the shaping frame of this patent develop a series of spaced lines having either less compression stress than the remainder of the glass edge or even tension stress. Any of these lines is a potential source of glass breakage.

SUMMARY OF THE INVENTION

The present invention provides a novel means for spacing one or both major surface of a glass sheet from direct contact with the shaping surface of a relatively heavy shaping rail or shaping frame that also engages the bent glass sheet during its quenching in prior art structures. The novel spacing means is screen means made of a material that is not easily worn by abrasion at elevated temperatures, such as stainless steel, and a preferred embodiment of said screen means comprises a relatively heavy wire mesh supported on the mold rail and a relatively fine wire mesh supported on the relatively heavy mesh, the latter serving to space the major surface of the glass sheet from the shaping rail. In case the apparatus is of the press bending type with two complementary shaping frames, both molds are so modified. In case the apparatus is of the press bending type comprising a solid shaping member and a shaping frame, only the shaping frame is so modified.

BRIEF DESCRIPTION OF THE DRAWINGS

The present invention will be better understood in the light of a description of certain preferred embodiments thereof. In the drawings that form part of the description and where like reference numbers refer to like structural elements, FIG. 1 is a perspective view of a jointed mold that may either be one of a pair of press bending molds or may be a gravity sagging mold that is modified according to the present invention;

FIG. 2 is a cross-sectional view taken along the lines II—II of FIG. 1;

FIG. 3 is a fragmentary enlarged perspective view of a portion of the apparatus shown in FIG. 1;

FIG. 4 is a view similar to FIG. 2 of an alternate embodiment;

DESCRIPTION OF THE PREFERRED EMBODIMENT

Figures 5, 6:
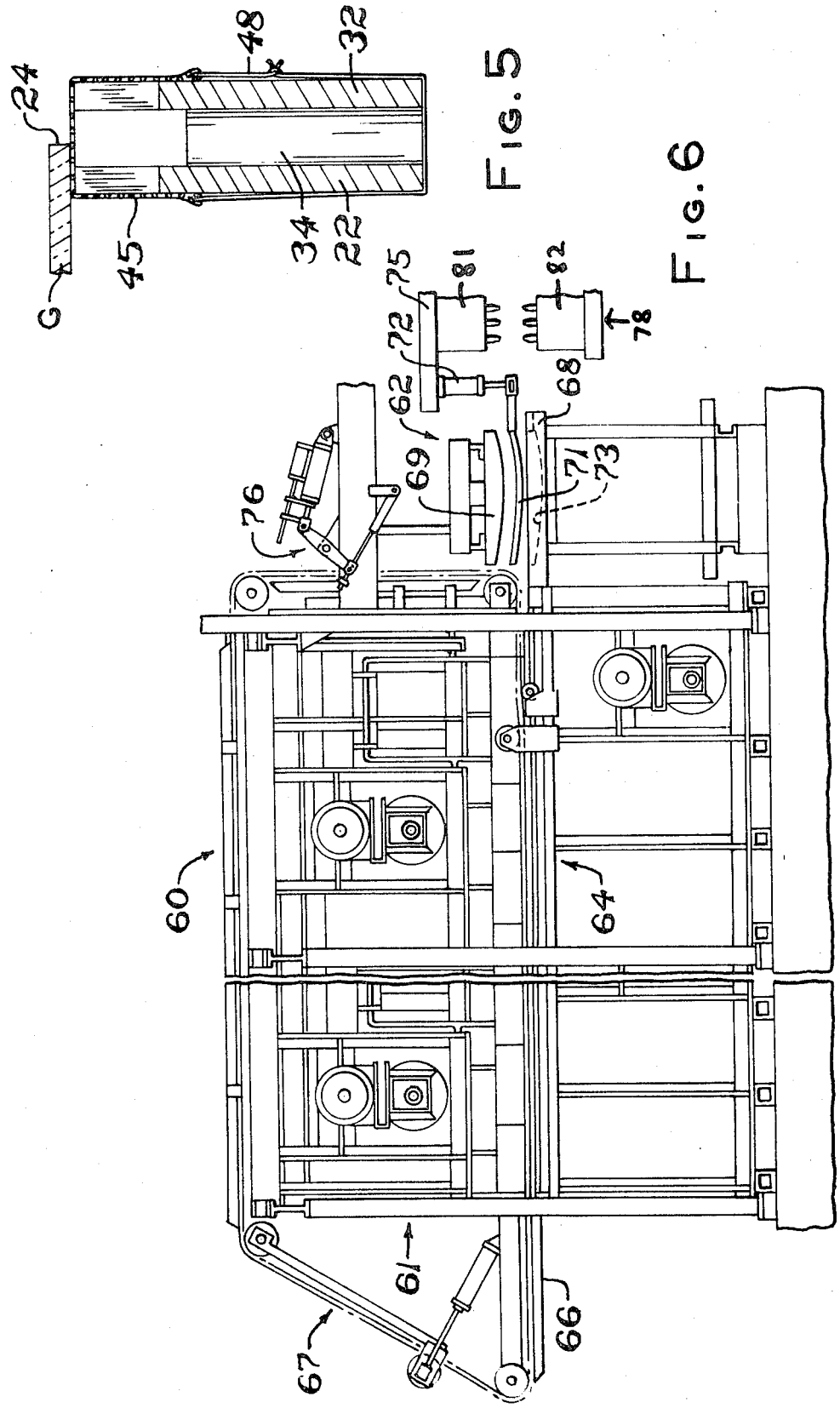
FIG. 5 is a similar view of still another embodiment.
FIG. 6 is a fragmentary showing of press bending apparatus using the present invention.

FIGS. 1 to 3 show a frame mold of the jointed or hinged type, although the mold may be a solid ring-type frame and may be either one of a pair of complementary press bending molds adapted to engage the opposite major surfaces of a glass sheet during shaping and cooling or a gravity sag type mold that engages the marginal portion of a glass sheet to control the configuration to which the glass sheet sags by gravity and that continues to support the marginal portion of the glass sheet during the cooling that follows heat sagging.

The mold in FIG. 1 comprises a main mold section 10 rigidly connected to a support member 11 and a pivotable mold section 12 pivotally connected to the main mold section through pivots 14. The support member also supports actuating means in the form of a piston 16 whose cylinder is fixed to support member 11 and whose piston rod 18 has a free end including a bracket provided with a pin 19 that is slidably connected to a slotted bracket 20 firmly secured to pivotable mold section 12. Thus, piston 16 actuates pivotal movement of the pivotable mold section 12 between an open position and a closed mold position about pivots 14 in a manner well known in the art.

FIGS. 2 and 3 show the novel construction of one embodiment of the present invention in detail. Each section of the mold comprises a first shaping rail 22 of 304 stainless steel one-eighth inch thick, 2 inches wide extending lengthwise in parallel relation to the peripheral edge of a glass sheet G and conforming in outline and contour to the shape desired for said glass sheet between one-eighth inch and one-half inch inside the peripheral edge surface 24 of the sheet, except for serrations or notches 26 disposed in spaced relation along the upper edge surface 28 of the first shaping rail 22 and recesses 27 (FIG. 1) for receiving fingers of a glass unloader.

An aligned shaping rail 32 is disposed outwardly of the first shaping rail 22, being separated by spacing members 34 welded to the facing surfaces of shaping rail 22 and 32 at spacings of several inches. The spacing members 34 and the aligned shaping rail 32 are composed of 304 stainless steel. The spacing members 34 are cylinders about 1 ½ inches high and about one-fourth inch in diameter and are connected between the shaping rail 22 and the aligned shaping rail 32 in such a manner that the spacing members are recessed below the upper surface 28 including the recesses 26 of the shaping rail 22.

Aligned shaping rail 32 has recesses 27 and notches 36 aligned with elements 27 and 26 of rail 22. In addition, the aligned shaping rail 32 has an upper edge surface 38 parallel to the upper edge surface 28 of the shaping rail 22. Thus, the edge surfaces 28 and 38 are aligned, the edge surface 28 conforming in contour and outline to the shape desired for the glass sheet G at least one-eighth inch inside of the glass peripheral edge surface 24 while edge surface 38 conforms to said desired shape along a contour disposed at least one-eighth inch outside of the peripheral glass edge surface 24. According to the present invention, screen means bridging the space between the shaping rail 22 and the aligned outer shaping rail 32 supports the margin of the glass sheet with the peripheral glass edge surface 24 spaced from the aligned rail 32 sufficient distance to let tempering air escape between the surface 24 and outer rail 32.

In the preferred embodiment of the present invention, the screen means consists essentially of two layers of inverted channel-shaped mesh comprising a relatively heavy wire mesh 40 having a web 42 and a relatively fine wire mesh 44 having a web 46. The first, relatively heavy wire mesh 40 is composed of 304 stainless steel 12 × 12 mesh composed of wire of 0.023 inch diameter containing 52 percent open area. Its web 42 is supported on the upper edge surfaces 28 and 38 and bridges the gap therebetween with the walls of the relatively heavy metal wire mesh 40 extending along the outer walls of the shaping rail 22 and aligned shaping rail 32.

The relatively fine wire mesh 44 is composed of 62 × 62 mesh wire of 0.004 inch diameter of 304 stainless steel containing 51 percent open area in spaced relation to the upper edge surfaces 28 and 38 with web 46 carried on web 42. Wires 48 extend through openings in one downwardly extending wall of fine wire mesh 44 and around the bottom of the shaping rail 22 and aligned shaping rail 32 through openings in the opposite downwardly extending wall of the inverted channel-shaped member of relatively fine wire mesh 44 to secure the two layers of wire mesh 40 and 44 of the shaping rails 22 and 32.

From the above, it is obvious that the relatively fine wire mesh engages the marginal portion of the major surface of the glass sheet and the relatively heavy mesh reinforces said relatively fine wire mesh.

The open area of the mesh permits tempering medium to cool the edge of the glass sheet at a much more rapid rate than the portion of the glass sheet facing the shaping rail 22. Hence, each layer of wire mesh must have a minimum of 40 percent open area.

The heavy mesh 40 must be sufficiently rigid to bridge the space between shaping rail 22 and aligned outer rail 32 and support the fine mesh 44 without sagging. Hence, the wire for the heavy mesh 40 must be at least 10 mils in diameter. However, the wire for the heavy mesh 40 must not be so thick that it would retard the cooling rate of the adjacent glass portion to such an extent that it would cause the adjacent glass to develop a temperature gradient so steep across the glass surface as to develop a tension stress large enough to cause surface cracks or vents in the glass. Therefore, the heavy wire mesh must be composed of wire having a maximum diameter of approximately 30 mils.

The fine mesh 44 preferably also has a minimum of 40 percent open area and is preferably approximately 1.5 mils to 6 mils in diameter with a corresponding mesh of 200 by 200 to 40 by 40.

As an alternative embodiment, a single layer of wire mesh 45 may be substituted for the double layer. In such a case, the wire mesh must have a minimum of 40 percent open area and be composed of wire ranging in diameter from approximately 0.003 inch for 105 by 105 mesh to approximately 0.006 inch for 40 by 40 mesh. FIG. 5 shows this embodiment.

The following tables list suitable mesh for single and double layers and acceptable ranges of wire diameters suitable for the heavy mesh and fine mesh of the two layer embodiment and a range of acceptable wire diameters for a single layer embodiment.

TABLE I

Suitable Wire Mesh Screens for Glass Bending Molds

| Type of layer | Mesh | Wire Diameter | % Open Area |
|---|---|---|---|
| Double Layer Embodiment | | | |
| Heavy Mesh | 12 × 12 | .023 inch | 52% |
| Heavy Mesh | 30 × 30 | .012 inch | 41% |
| Fine Mesh | 40 × 40 | .006 inch | 52% |
| Fine Mesh | 60 × 60 | .0055 inch | 45% |
| Fine Mesh | 180 × 180 | .0018 inch | 46% |
| Fine Mesh | 200 × 200 | .0015 inch | 49% |
| Single Layer Embodiment | | | |
| Single Mesh | 40 × 40 | .006 inch | 52% |
| Single Mesh | 60 × 60 | .0055 inch | 45% |
| Single Mesh | 84 × 84 | .004 inch | 45% |
| Single Mesh | 105 × 105 | .003 inch | 47% |

TABLE II

RANGE OF ACCEPTABLE WIRE MESH DIAMETER

| Range for Double Mesh | Acceptable Diameter Range | Minimum % Open Area |
|---|---|---|
| Heavy Mesh | .010 to .030 inch | 40% Minimum |
| Fine Mesh | .0015 to .006 inch | 40% Minimum |
| Range For Single Mesh | .003 to .006 inch | 40% Minimum |

In case the present invention is used in press bending apparatus, the frame-type mold is duplicated with a similar mold comprising a second shaping rail having an edge shaping surface complementary to the edge shaping surface 28 of the first shaping rail 22, a second aligned shaping rail having an edge shaping surface complementary to that of the edge shaping surface 38 of the first aligned shaping rail 32 and inverted channel-shaped members of relatively heavy wire meshlike mesh 40 and of relatively fine wire mesh identical to wire mesh 44 attached to the second shaping rail and second aligned shaping rail in a manner identical to the manner used in the embodiment described above.

When a glass sheet G is press bent and then cooled rapidly while sandwiched between a pair of complementary molds of the type described above, the peripheral edge including the edge surface 24 of the glass sheet develops a compression stress suitable to protect the glass from breakage. At the same time, the portion of the glass sheet that has its cooling rate retarded because of its direct contact with the relatively heavy shaping rail if the prior art teaching as evidenced by the Vranken patent is practiced, is maintained in spaced relation to the glass engaging frame, thus lessening the moderation effect on the cooling of the glass sheet portion that usually is in direct engagement with a relatively massive member. If the present invention is followed, the portion of the glass sheet that previously was in direct engagement with the shaping frame is now in spaced relation to the shaping frame during cooling, thus causing less retardation of the cooling rate and a lower maximum tension stress results. Therefore, glass sheets bent and tempered while engaged by molds modified according to the present invention have lower tension stresses, thus resulting in fewer production losses due to tension stress breakage.

FIG. 4 shows an alternate embodiment of the present invention in which the shaping mold comprises a frame including a continuous or jointed type of single shaping rail 52, instead of the pair of spaced shaping rails 22 and 32, provided with notches 26 and having the previously described so-called double layer embodiment comprising an inverted channel member of relatively heavy wire mesh 40 having an open area of at least 40 per cent and composed of wire having a diameter of approximately 0.01 inch to approximately 0.03 inch directly over the shaping rail 52 with another inverted channel member of relatively fine wire mesh 44 having an open area of at least 40 percent and composed of wire having a diameter of approximately 0.0015 inch to approximately 0.006 inch superimposed over mesh 40 and attachment wires 48 securing the inverted channel members to the shaping rail 52 as in the prior embodiment. As with the other embodiment, a complementary shaping rail may be used in cooperation with the shaping rail 52 for press bending instead of gravity sagging.

While the invention has been described in the light of improving the construction of ring-type molds used for gravity sag bending or for press bending apparatus comprising a ring-type or frame-type mold in combination with a complementary ring-type mold, it is also contemplated within the scope of the present invention to use either embodiment of the present invention in cooperation with a continuous male press bending mold as in U.S. Pat. No. 3,367,763 to Pickavance et al. or with a vacuum-type press bending mold as in U.S. Pat. No. 3,574,588 to Nitschke.

FIG. 6 shows an important part of a press bending and tempering apparatus 60 of the type generally shown in said Nitschke patent that includes a furnace 61, a bending station 62, and also including a tempering station 78 comprising conventional spaced opposed plenum chambers 81 and 82 and a conventional unloading station (not shown). The apparatus 60 includes an elongated apertured gas support bed 64 for supporting sheets of glass on a film of gas thereover. The gas support bed 64 has a first end 66 extending from a first end of the furnace to provide a loading station.

A conveying means generally indicated at 67 moves a sheet of glass along the bed 64 from the first end 66 to a second end 68 disposed in the lower part of the bending station 62. The second end 68 is provided with an endless recessed portion 73 adapted to receive a frame mold 71 constructed in the manner described and shown for the various embodiments of the present invention.

The bending station 62 is disposed above the second end 68 of the support bed 64 and includes an apertured glass sheet supporting surface for supporting a sheet on a film of gas thereover. The glass sheet supporting surface of the bed 64 has apertures therein through which gases flow to support a sheet of glass on the film of gases over the sheet supporting surface. An apertured forming surface means or mold 69 is disposed above the support surface in the bending station 62 for bending a sheet as the sheet is pressed thereagainst. Mold 69 is supported for vertical movement by an actuation mechanism 76 between an upper recessed position and a lower glass engaging position.

The frame mold, which is generally indicated at 71, comprises a pair of outline rails 22 and 32 supporting either a single layer of mesh 45 as in FIG. 5 or a double layer of mesh 40 and 44 as depicted in FIGS. 2 and 3 or a single outline rail 52 with a serrated upper surface supporting mesh layers 40 and 44 as in FIG. 4 to enable a wire mesh web 46 serve as the glass sheet supporting surface of the mold 71. The latter is supported in cantilever fashion from a transfer carriage 75 which moves the frame mold laterally or generally horizontally into the tempering station 78 where air is blasted against the opposite surfaces of the supported glass. The frame mold 71 is attached to an elevator means 72 supported on carriage 75. The elevator 72 is arranged to support the mold 71 in an upper position except when mold 71 is disposed over the recess 73, when the elevator is free to move the frame mold 71 between a lower position wherein the mold 71 is received in recess 73 and an upper position wherein the mold 71 presses a supported hot glass sheet against the downward facing shaping surface of mold 69 when the latter is in its downward position.

Beyond the shaping station 62 lies a tempering station 78 where glass supported on the mold 71 is subjected to air blasts. The use of screen means to space the supported glass sheet from direct contact with the mold rails permits the free flow of cold air under pressure against the glass surface, particularly along its marginal edge. Transfer carriage 75 is supported for horizontal movement so that mold 71 in its upward position moves into and through the tempering station 78 between upper nozzles extending downward from an upper plenum 81 and lower nozzles extending upward from a lower plenum 82. The transfer carriage 75 may be reciprocated while the mold is between plenums 81 and 82 and air is blasted through said nozzles.

In the generally overall operation of the apparatus 60, hot gases are supplied through the bed 64 to provide a film or blanket of hot gases over the surface of bed 64. The furnace 61 also includes an upper heat-supply system for supplying heat to the upper surfaces of the sheets as they move through the furnace. A sheet of glass is disposed on the bed 64 at the loading station 66. The conveying means 67 moves the sheet of glass along the gas support bed 64 toward the second end 68. During such movement, the sheet of glass is being heated to a temperature to allow it to be deformed or bent. When the sheet of glass reaches the second end 68 of the bed 64, the sheet of glass is at the bending station 62 above the frame mold 71, which is position in the groove 73 to await the arrival of a glass sheet from the furnace 60. The elevator means 72 lifts the frame mold 71 to lift the sheet of glass upwardly to allow the sheet to deform or sag under the force of gravity or to press the sheet against the forming surface mold 69 for bending the sheet. In the preferred embodiment, a vacuum is applied to the forming surface mold 69 to pull the sheet into conformance with the surface thereof. An appropriate means may be utilized to apply a vacuum to passages in the forming surface means 69. After the sheet has been curved or bent, the vacuum is removed from mold 69 thus depositing the bent glass on frame mold 71, actuating mechanism 76 lifts the mold 69, and transfer carriage 75 moves the frame mold 71 laterally or horizontally to move the sheet into the tempering station where it is cooled, annealed or tempered by pressurized air blasts.

The cooled bent glass sheet is removed from the frame mold 71 and the carriage 75 returns the unloaded frame mold 71 to the bending station 62, elevator means 72 lowers the frame mold 71 into recess 73 and actuating mechanism 76 lowers the upper mold 69 to await the arrival of the next glass sheet from the furnace 61 along bed 64.

In each combination, substituting a ring-type mold provided with relatively fine wire mesh as the means to engage the glass edge peripheral portion and with relatively heavy wire mesh to space the glass engaging means from the shaping rail or shaping frame serves to reduce the maximum tension stress produced in the bent, tempered glass sheets treated by the apparatus compared to that produced by the corresponding prior art apparatus. Hence, the present invention reduced the likelihood of glass breakage resulting from the bending and tempering operation.

The form of the invention shown and described in this disclosure represents an illustrative preferred embodiment and certain modifications thereof. It is understood that various changes may be made without departing from the gist of the invention as defined in the claimed subject matter which follows.

I claim:

1. Apparatus for bending and tempering a glass sheet comprising a first shaping rail disposed edgewise and having an edge surface conforming in outline and contour to the shape desired between one-eighth inch and one-half inch inside the periphery of said glass sheet after bending, a first, relatively heavy wire mesh having at least 40 per cent open area supported by said shaping rail, and a first, relatively fine wire mesh having at least 40 percent open area supported by said first, relatively heavy mesh and positioned to engage a major surface of said glass sheet in its peripheral portion, said relatively heavy mesh being composed of wire having a diameter of approximately 0.01 inch to approxi 0.03 inch and said relatively fine mesh being composed of wire having a diameter of approximately 0.0015 inch to approximately 0.006 inch.

2. Apparatus as in claim 1, wherein said wire mesh is composed of stainless steel.

3. Apparatus in claim 1, further including a second shaping rail disposed edgewise and having an edge surface complementary to said edge surface of said first shaping rail, a second relatively heavy wire mesh similar to said first relatively heavy wire mesh supported by said second rail and a second, relatively fine mesh similar to said first relatively fine wire mesh supported by said second, relatively heavy mesh and positioned to engage the opposite surface of said glass sheet in its peripheral portion, whereby the opposite major surfaces of said glass sheet are engaged between said first and second, relatively fine wire meshes in spaced relation to said shaping rails during said bending and tempering.

4. Apparatus as in claim 3, wherein said wire mesh is composed of stainless steel.

5. Apparatus as in claim 1, further comprising a first aligned shaping rail disposed outwardly of said first shaping rail and having an edge surface aligned with said edge surface of said first shaping rail, means interconnecting said first shaping rail and said first aligned shaping rail in sufficiently spaced relation to one another that said first shaping rail is disposed inward of the periphery of said bent glass sheet and said first aligned shaping rail is disposed outward of the periphery of said bent sheet, said first, relatively heavy wire mesh in superimposed position over said edge surfaces to bridge the space therebetween, and means for supporting said first, relatively fine wire mesh in superimposed position over said first, relatively heavy wire mesh and said first, relatively heavy wire mesh over said edge surfaces.

6. Apparatus as in claim 5, wherein said wire mesh is composed of stainless steel.

7. Apparatus as in claim 5, further including a second shaping rail disposed edgewise and having an edge surface complementary to said edge surface of said first shaping rail, and also comprising a second aligned shaping rail disposed outwardly of said second shaping rail and having an edge surface aligned with said edge surface of said second shaping rail, means interconnecting said second shaping rail and said second aligned shaping rail in sufficiently spaced relation to one another that said second shaping rail is disposed inward of the periphery of said bent glass sheet and said second aligned shaping rail is disposed outward of the periphery of said bent sheet, a second, relatively heavy wire mesh similar to said first, relatively heavy wire mesh in superimposed relation over said edge surfaces of said second shaping rail and said second aligned shaping rail to bridge the space therebetween a second, relatively fine wire mesh similar to said first, relatively fine wire mesh, and means for supporting said second, relatively fine wire mesh in superimposed position over said second relatively heavy wire mesh and said second, relatively heavy wire mesh over said edge surfaces.

8. Apparatus as in claim 7, wherein said wire mesh is composed of stainless steel.

9. Apparatus for bending and tempering a glass sheet comprising a first shaping rail disposed edgewise and having an edge surface conforming in outline and contour to the shape desired between one-eighth inch and one-half inch inside the periphery of said glass sheet after bending, a first aligned shaping rail disposed outwardly of said first shaping rail and having an edge surface aligned with and spaced from said edge surface of said first shaping rail and conforming in outline and contour to an outline spaced one-eighth inch to one-half inch outward of the periphery of said glass sheet after bending, and screen means having an open area of at least 40 percent and composed of wire mesh taken from the class of a single layer of wire having a diameter of approximately 0.003 inch to approximately 0.006 inch bridging said space between said edge surfaces and supported by said shaping rails for supporting the marginal edge portion of said glass sheet between said aligned rails and two layers of wire consisting essentially of a first layer of relatively heavy mesh composed of wire having a diameter of approximately 0.01 inch to approximately 0.03 inch in direct contact with said rails and a second layer of relatively light mesh composed of wire having a diameter of approximately 0.0015 inch of approximately 0.006 inch in direct contact with said relatively heavy mesh.

10. Apparatus as in claim 9, wherein said shaping rails form parts of a frame type mold, said mold comprising mold sections pivotally interconnected to one another, and means operatively connected to at least one of said mold sections to move said connected mold section between an open position and a closed mold position, said first shaping rail and said first aligned shaping rail being sectionalized to form interconnected shaping rail sections conforming to different of said mold sections.

11. Apparatus as in claim 9, wherein said screen means comprises a single layer of stainless steel wire mesh.

12. Apparatus as in claim 9, further including a vacuum type mold having a contour conforming to those of said first shaping rail and said first aligned shaping rail and means to provide relative movement between said shaping rails and said vacuum type mold.

* * * * *